United States Patent [19]

Stevens

[11] Patent Number: 4,506,163
[45] Date of Patent: Mar. 19, 1985

[54] STARTER MOTOR HOUSING

[75] Inventor: Julius J. Stevens, Fort Deposit, Ala.

[73] Assignee: Teledyne Industries, Inc., Los Angeles, Calif.

[21] Appl. No.: 487,265

[22] Filed: Apr. 21, 1983

[51] Int. Cl.³ .............................................. F02N 11/00
[52] U.S. Cl. ................................ 290/38 R; 290/36 R; 290/38 A; 290/46; 290/48; 290/49; 310/154; 74/6; 74/7 R
[58] Field of Search ..................... 290/38, 38 A, 38 R, 290/38 C, 46, 36 R, 47, 48, 49; 310/154, 181, 190, 191, 46, 254, 152, 158; 74/6, 7

[56] References Cited

U.S. PATENT DOCUMENTS

| | | | |
|---|---|---|---|
| 2,812,454 | 11/1957 | Buck | 310/46 |
| 2,923,830 | 2/1960 | Merriam, Jr. et al. | 290/38 R |
| 2,944,427 | 7/1960 | Antonidis et al. | 290/38 R X |
| 3,466,476 | 9/1969 | Snowdon | 310/154 X |
| 4,074,159 | 2/1978 | Robison | 310/154 |
| 4,099,104 | 7/1978 | Muller | 318/138 |
| 4,175,237 | 11/1979 | Mazzorana | 290/38 R |
| 4,414,481 | 11/1983 | de Jong | 310/154 X |

Primary Examiner—J. V. Truhe
Assistant Examiner—Paul Shik Luen Ip
Attorney, Agent, or Firm—Gifford, VanOphem, Sheridan, Sprinkle & Nabozny

[57] ABSTRACT

A starter motor housing comprising a tubular housing formed by an annular wall having a thickened wall portion adjacent the stator winding of the starter motor. The stator cores abut against and are secured to the inner periphery of the thickened wall portion to increase the flux path and, thus, the effective flux energy produced by the stator windings. However, the thickened wall portion is disposed intermediate radially reduced wall end portions to reduce the weight and size of the motor housing. Preferably, the tubular housing is an iron casting.

5 Claims, 2 Drawing Figures

STARTER MOTOR HOUSING

BACKGROUND OF THE INVENTION

I. Field of the Present Invention

The present invention relates generally to electrical motor apparatus, and more particularly, to a starter motor having a stator winding fixedly secured within the housing and a rotor winding mounted on a rotatable shaft in the housing within the stator winding.

II. Description of the Prior Art

Starter motors are well known devices for initiating operation of a turbine engine such as those used in aircraft. A starter motor typically includes a shaft rotatably mounted in a housing and having a rotor winding secured thereto for rotation therewith. The rotor winding is positioned within a circumferential stator winding. The housing encloses the windings and other electrical components in order to protect them from environmental conditions and debris. Quite often the housing is generally cylindrical and closed at both ends so that only an end of the shaft extends outwardly from a starter motor, whereby the shaft can be coupled by a mechanism to the turbine shaft.

In previously known starter motors, the power output of the motor is determined by the size and construction of the windings in the motor. Thus, the windings and the magnetic cores associated therewith determine the size of the housing which is necessary to enclose these parts. On the other hand, it is advantageous to minimize the size and weight of any component carried by an aircraft. Thus, a housing construction primarily designed for enclosing the electrical components of the starter motor can result in a starter motor which is extremely large and bulky. Such a motor presents problems in positioning and supporting the starter motor, and can have a significant effect upon size, weight and handling characteristics of an aircraft.

SUMMARY OF THE PRESENT INVENTION

The present invention overcomes the above-mentioned disadvantages by providing a starter motor having a tubular magnetic housing with a thickened wall portion adjacent a stator winding in the housing. Such a construction increases the flux path through the stator winding and, thus, increases the efficiency of the stator winding without requiring reconstruction or enlargement of the stator winding. Moreover, the thickened portion need only be provided adjacent to the stator winding, the remainder of the housing being of a reduced diameter to minimize the size and weight of the motor housing.

In particular, the housing preferably comprises an iron housing formed as a tubular member by an annular wall. A central portion of the wall includes a thickened, enlarged diameter peripheral wall portion which forms an annular rib and intermediate reduced diameter peripheral end portions. Accordingly, the starter housing takes up less space than previously known, equally powerful starter motors. In addition, the reduced diameter peripheral wall portions require less material and, thus, result in a housing which is lighter than previously known substantially cylindrical starter motor housings.

BRIEF DESCRIPTION OF THE DRAWING

The present invention and its advantages will be more clearly understood by reference to the following detailed description of a preferred embodiment when read in conjunction with the accompanying drawing in which.

DETAILED DESCRIPTION OF A PREFERRED EMBODIMENT OF THE PRESENT INVENTION

Figure 1:
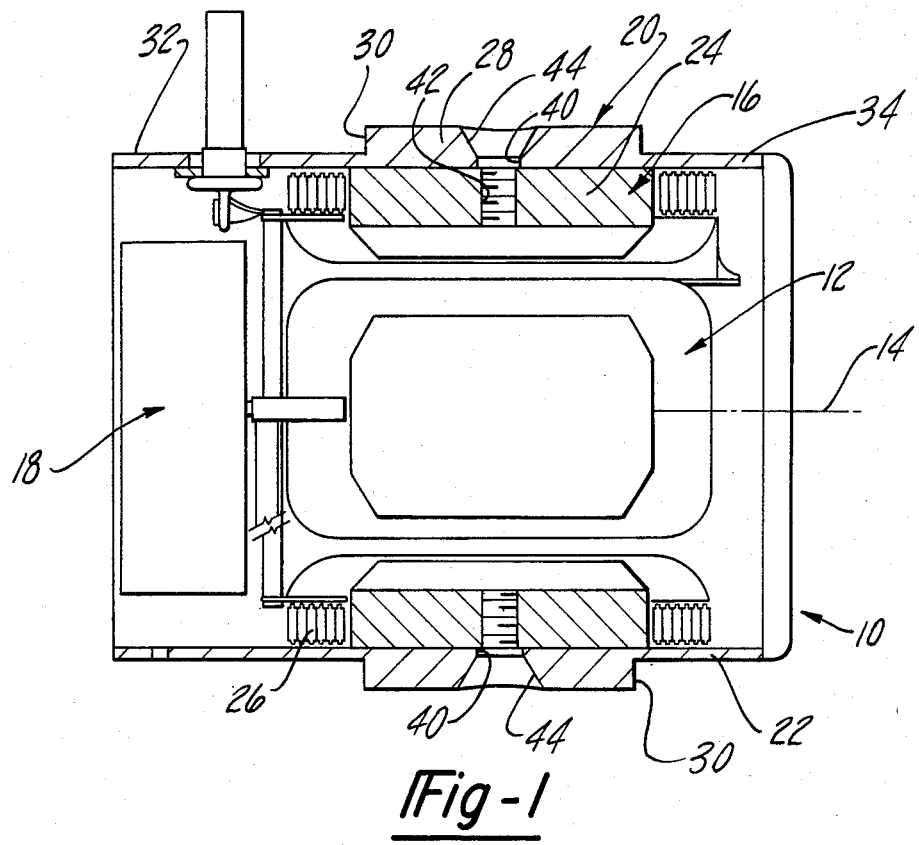
FIG. 1 is a sectional elevation showing a starter motor constructed in accordance with the present invention.

Referring first to FIG. 1, the starter motor 10 is thereshown comprising a rotor winding indicated diagrammatically at 12 which is secured to a shaft (not shown) rotatable about the axis 14. The rotor winding 12 rotates within a stator winding 16 annularly disposed about the rotor winding 12. The windings 12 and 16, as well as additional components such as the brush and holder assembly 18, are enclosed within a tubular housing 20. The open ends of the housing 20 are closed by end plates (not shown) which include bearings for rotatably supporting the shaft about the axis 14.

Figure 2:
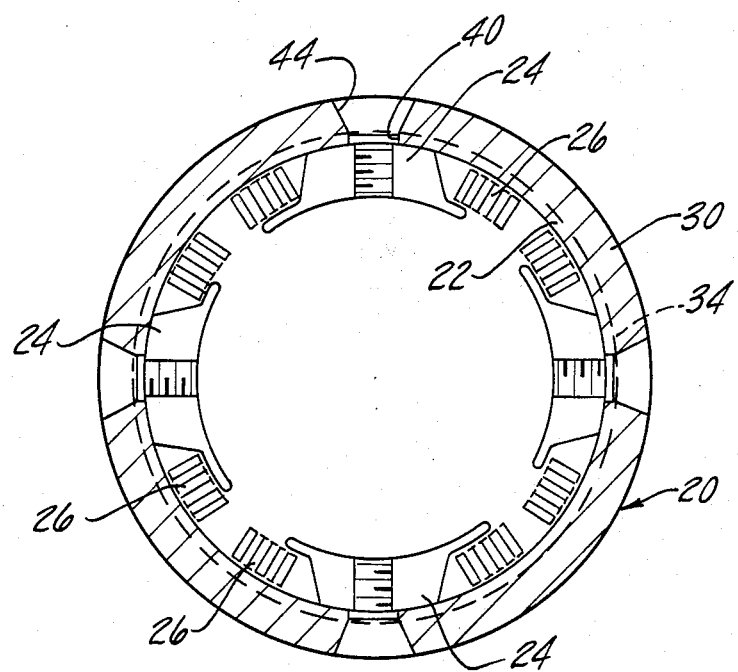
FIG. 2 is an axial cross-sectional view of the starter motor shown in FIG. 1 with parts removed for clarity.

Referring now to FIG. 2, it can be seen that the tubular housing 20 is formed by an annular wall 22. The inner periphery of the annular wall 22 abuts against a plurality of stator cores 24, each core 24 having coils 26 of an electrical conductor wrapped around the core 24.

Referring again to FIG. 1, the housing 20 includes a thickened wall portion 28 of the annular wall 22 which forms an outwardly extending rib 30 on the periphery of the housing 20. The rib 30 is axially extended substantially the same distance as the axial length of the stator cores 24. However, as shown in FIG. 1, the rib 30 can be slightly shorter than the axial length of the stator cores 24 to further reduce the weight of the housing 20 so long as the rib 30 is substantially centrally aligned with the axial center of the stator cores 24. In any event, the rib 30 extends between end portions 32 and 34 where the radial width of the annular wall 22 has been reduced. In the preferred embodiment shown in FIG. 1, the reduced radial width of the end portions 32 and 34 results in a reduced diameter periphery at each end of the housing 20.

The magnetic flux path is enhanced due to the increased mass of the stator cores 24 produced by the physical coupling between the rib 30 and the stator cores 24. As shown in both FIGS. 1 and 2, the physical coupling is provided by inserting a threaded fastener such as a bolt (not shown), through the bore 40, and screwing it into the radially aligned threaded bore portion 42. Preferably the bore portion 40 in the rib 30 includes a counter sink portion, as shown at 44, so that the top of the rib 30 defines the outermost portion of the housing 20.

Having thus described the important structural features of the preferred embodiment of the present invention, the operation of the starter motor housing according to the present invention is readily described. Since the rib 30 effectively increases the mass of the stator cores 24, the flow path for the magnetic field produced by the current flowing through the windings 26 is increased so that losses in the magnetic field are minimized, and the field strength exerted upon the rotor winding 12 causes a greater repulsion force against the rotor 12 to cause rotation of the rotor about the axis 14. Nevertheless, since the annular wall 22 is thickened only along the rib portion 30, the end portions 32 and 34 of the housing 20 are substantially lighter than previ- ously known uniformly thick housings. Moreover, the reduced diameter periphery of the end portions 32 and 34 decreases the space occupied by the starter motor 10 within the aircraft, and permits the use of smaller and less bulky end caps 32 and 34 for the starter motor 10. In addition, it will be understood that the simple construction of the housing 20 permits it to be formed as a simple casting which can be machined to any desired tolerance or size. In any event, it will be understood that the housing 20 construction according to the present invention improves the efficiency and performance of the starter motor 10 as well as enclosing the components of the starter motor 10 and protecting them from environmental conditions or debris.

Having thus described my invention, many modifications thereto will become apparent to those skilled in the art to which it pertains without departing from the scope and spirit of the invention as defined in the appended claims.

What is claimed is:

1. In a starter motor of the type having a tubular and cylindrical housing of a magnetic material, a rotor having a motor windings rotatably mounted within said housing, and a plurality of circumferentially and axially spaced stator windings rotatably mounted within said housing, and a plurality of circumferentially and axially spaced stator windings within the housing, the improvement comprising a radially thickened portion of said housing which forms a flux path between said axially spaced stator windings, said thickened portion having an axial length no greater than the axial spacing between said stator windings, said thickened portion having a radial thickness at least twice the thickness of the housing adjacent the thickened portion and said thickened portion being positioned in between said stator windings whereby the overall weight of said housing is reduced while the thickened portion forms the flux path for the stator windings.

2. The invention as defined in claim 1 wherein the axial length of said thickened portion is less than the axial spacing between said stator windings.

3. The invention as defined in claim 1 and comprising a plurality of circumferentially spaced stator cores secured to said housing between said stator windings.

4. The invention as defined in claim 1 wherein said magnetic material contains iron.

5. The invention as defined in claim 1 wherein said magnetic material is iron.

* * * * *